UNITED STATES PATENT OFFICE.

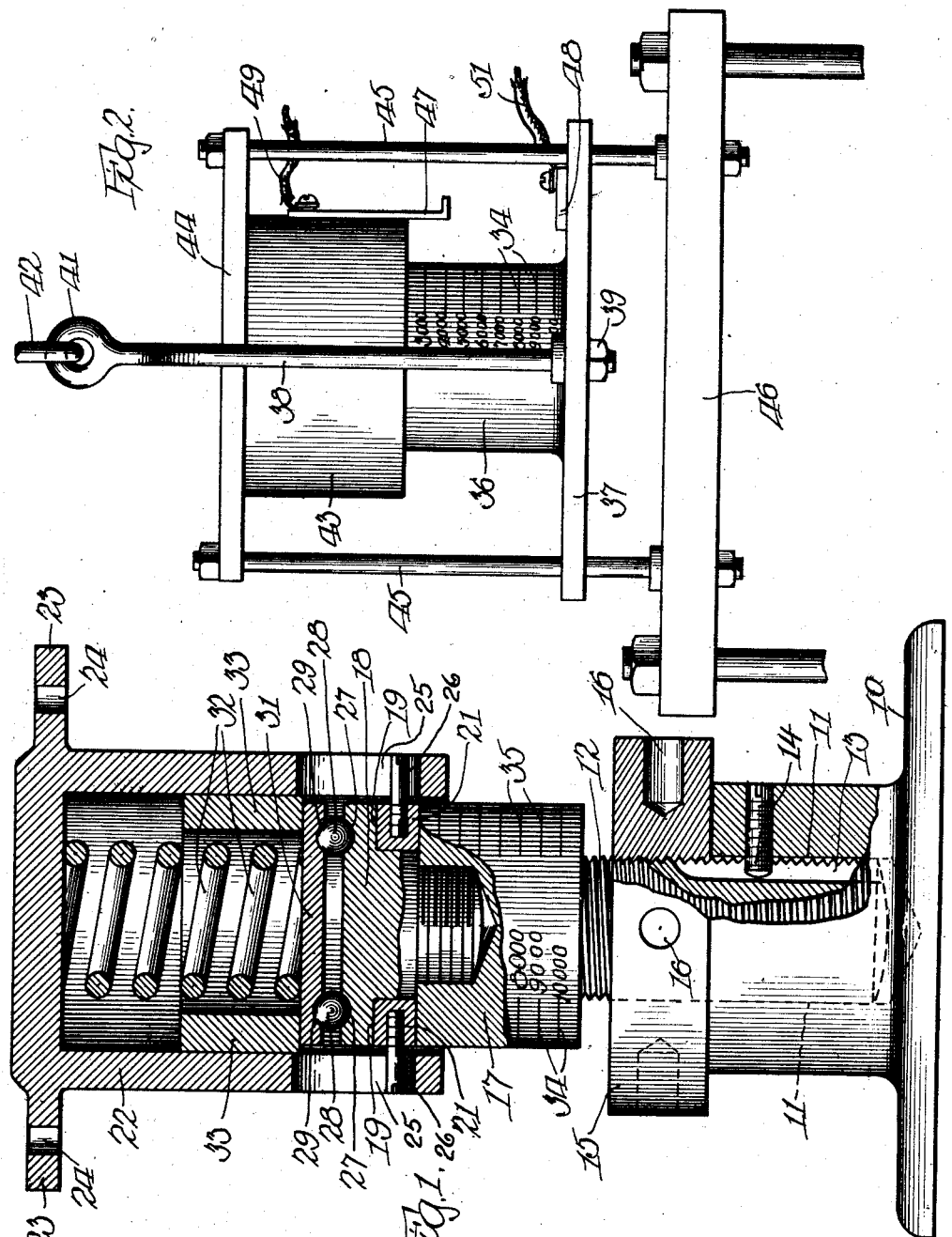

GEORGE KAUPERT, OF CHICAGO, ILLINOIS.

LOAD-INDICATOR.

1,281,389.  Specification of Letters Patent.  Patented Oct. 15, 1918.

Application filed March 18, 1918. Serial No. 223,042.

*To all whom it may concern:*

Be it known that I, GEORGE KAUPERT, a subject of the Emperor of Germany, residing at Chicago, in the county of Cook and State of Illinois, have invented certain new and useful Improvements in Load-Indicators, of which the following is a specification.

My invention relates to load indicators, and has for its primary object the provision of an improved machine of this character which shall be portable and of such shape as to be readily placed beneath an object to be weighed or tested between any elements which exert opposing force in order that the load placed on the indicator may be determined.

A further object is the provision of an improved construction for such an indicator whereby it may be adapted for suspension from an overhead support for the purpose of weighing objects suspended from it.

Other objects and advantages will appear from the following description, taken in conjunction with the accompanying drawings which form a part of this specification and illustrate the preferred embodiment of the invention.

In the drawings:

Figure 1 is a front elevation, partly in section, of the invention, illustrating that form thereof which is adapted to indicate the force with which two elements are pressed toward each other; and Fig. 2 is a front elevation of that form of the invention adapted to measure the force which two elements exert when moving away from each other.

Referring to Fig. 1, a flat bottomed pedestal 10, having an upwardly opening socket 11, is interiorly fitted with an outwardly threaded spindle 12 vertically slidable in the pedestal. A vertical guideway 13 is cut in the side of the spindle and receives a guiding stud 14 whereby the spindle is held from rotation in the pedestal. A strong collar 15 is threaded upon the spindle and finds its support on the flat top of the pedestal. By inserting a bar in holes 16 formed in the collar the latter may be rotated upon the spindle to elevate or lower the spindle in the pedestal.

The upper portion of the spindle is formed into a cylindrical head 17 into the socketed top of which is threaded securely a cap 18 peripherally channeled at its lower end as at 19 to receive a rotatable ring 21. Surrounding the cap 18 and the head 17 is a weight receiving hood 22 preferably formed with laterally extending lugs 23 that are apertured as at 24 in order that an object to be weighed may be bound to the hood by cables passing through the apertures. Vertical slots 25 are formed near the lower edges of the hood at opposite sides thereof and posts 26 projecting laterally from ring 21 have their free ends standing in these slots, so that contact between the posts and the lower ends of the slots prevents casual dislodgement of the hood from the head 17 and cap 18.

The horizontal upper surface of cap 18 is annularly grooved as at 27 and bearing balls 28 travel in this groove and engage a similar groove 29 formed in the lower surface of a spring supporting plate 31 that lies on the balls. A stout helical spring 32 is bottomed upon the plate 31 and on its upper end supports the hood 22. This spring is kept from buckling against the sides of the hood under pressure by means of a hollow cylindrical filler 33 fitting the interior of the hood, resting on the edge of plate 31 and substantially filling the space between the spring and hood. Contact between the top of filler 33 and the upper end of the hood also limits the downward travel of the hood on the spindle and head. The head is marked with graduations 34 positioned to stand level with the lower edge of the hood in succession as each thousand pounds of pressure is put upon the hood. A series of calibrations 35 may also be placed upon the head to indicate the pressure by metric units of weight or tests.

In the operation of the embodiment shown in Fig. 1 an object to be weighed is placed upon the hood, or the device is placed beneath the object and operated as a lifting jack by rotation of collar 15 until the full load rests on the hood. The lower edge of the hood will now stand opposite or near one of the graduations 34 or calibrations 35 indicating the pressure exerted on the apparatus. Should the object being weighed turn on a vertical axis as the device is assuming the load, such torque is not communicated to the pedestal or spindle, as the ring 21 is rotatable in the cap and the spring plate 31 turns on the cap and bearing balls. This form of the indicator is useful in testing of live load, evidential load, and snow and wind load of building construction, the distribution of weight in houses to be moved; the strength of die press jaws; the weights or tests of bridges or very heavy castings, and the stresses that may be safely put upon fabricated steel structures of various kinds. It is not necessarily used in an upright position, but may be interposed between any elements that exert pressure toward each other.

In Fig. 2 is illustrated that form of my invention adapted to test the force by which two elements draw away from each other. The cylindrical head 36 is formed with a fixed base plate 37 by means of which the head is hung in a steel yoke 38 the lower ends of which enter apertures bored in the base plate and are fixed therein by lock nuts 39, only one of the latter appearing in the drawing. The upper end of the yoke is provided with a ring 41 into which any suitable supporting hook 42 may be inserted in order to suspend the apparatus.

A hood 43 surrounds the head 36, as is the case in Fig. 1, and a bar 44 mounted across the top of this hood carries by its ends the upper extremities of tension rods 45, these rods sliding vertically in apertures provided in the base plate 37 at a quadrant's distance from the respective lower ends of yoke 38. The lower ends of the tension rods carry a weight holding frame generally indicated at 46 and in which may be placed an object to be weighed or to which may be attached an element exerting pressure in a direction away from hook 42. The interior construction of the head 36 and hood 43 may be the same as in Fig. 1, though the elements permitting their relative rotation on a vertical axis may be omitted.

A thrust arm 47 depends below the lower edge of the hood 43 in position to contact with a thrust block 48 mounted on the base plate 37. Contact between these elements limits the descent of the hood 43 on its head. If desired the thrust arm and thrust block may be electrically isolated from the hood and base plate by suitable insulation (not shown) and respectively connected to electric wires 49 and 51, and these wires may, when connected by the contact just described, be used to control electrical devices whereby the movement of frame 46 away from hook 42 is stopped.

In the operation of the apparatus shown in Fig. 2 the hook 42 may be hung from a traveling crane and such objects as railroad cars, cannon, locomotives, and the like be placed in frame 46 for weighing; or the apparatus may be hung from a roof or bridge girder and weight gradually added to the frame to test the supporting strength of the girder. This apparatus may also be employed in a horizontal position to indicate the pull exerted by an engine in starting a train of cars.

Both forms of my invention may be used in practically demonstrating the accuracy of the calculations of mechanical engineers as to the weights and stresses of heavy structures being built on their designs.

While I have illustrated and described the preferred embodiments of my invention, it is obvious that one skilled in the art may make modifications thereof without departing from the spirit of the invention. I wish therefore not to be restricted to the precise embodiments shown except in so far as the same are limited in the appended claims.

I claim:

1. A load indicator comprising a cylindrical head having a top annular groove, a hood telescoped upon the head, a plate mounted on the head within the hood and annularly grooved in its bottom, a spring interposed between the plate and hood, and anti-friction elements carried in registering grooves formed in the head and plate.

2. A load indicator comprising a cylindrical head, a hood telescoped upon the head, there being vertical slots formed in opposite sides of the hood near the lower end thereof, a ring rotatably carried by the head, posts protruding laterally from the ring into said slots, and a spring interposed between the head and hood.

3. A load indicator comprising a head, a peripherally channeled cap secured upon the head, a ring rotatably carried in said channel, a spring supporting plate mounted rotatably on the cap, a hood telescoped upon the head and cap, a spring interposed between the hood and said plate, there being vertical slots formed in opposite sides of the hood near the lower end thereof, and posts fixed in said ring and projecting into the slots.

4. A load indicator comprising a pedestal having an upwardly opening socket, an exteriorly threaded spindle slidably engaging said socket, means for preventing rotation of the spindle in the pedestal while permitting it to slide vertically, a collar threaded upon the spindle and rotatably supported on the pedestal, a cylindrical head formed on the upper end of the spindle, a hood telescoped upon the head, and a spring interposed between the head and hood.

5. A load indicator comprising a pedestal having an upwardly opening socket, an exteriorly threaded spindle slidably engaging said socket, means for preventing rotation of the spindle in the pedestal while permitting it to slide vertically, a collar threaded upon the spindle and rotatably supported on the pedestal, a cylindrical head formed on the upper end of the spindle, a peripherally channeled cap secured upon the head, a ring rotatably carried in said channel, a spring supporting plate mounted rotatably on the cap, a hood telescoped upon the head and cap, a spring interposed between the hood and said plate, there being vertical slots formed in opposite sides of the hood near the lower end thereof, and posts fixed in said ring and projecting into the slots.

6. A load indicator comprising a head, a hood telescoped upon the head, a helical spring of smaller diameter than the head interposed between the head and hood, and a cylindrical filler fitting slidably within the hood, surrounding the spring, and resting upon the head, said filler approaching the spring to prevent its buckling and being of sufficient length axially of the hood to contact with the hood and limit the inward travel of the head.

7. A load indicator comprising a head, a plate rotatably mounted on the head, a hood telescoped on the head, a helical spring interposed between the head and plate, and a member bottomed on the plate within the hood and shaped to limit travel of the head into the hood and to prevent buckling of said spring.

8. A load indicator comprising a head formed with a base plate, a yoke straddling the head and connected to the base plate, a hood telescoped upon the head, a spring interposed between the head and hood, a load supporting frame, and means guided in the base plate for connecting said frame to the hood.

9. A load indicator comprising a head formed with a base plate, a yoke straddling the head and connected to the base plate, a hood telescoped upon the head, a spring interposed between the head and hood, a load supporting frame, means guided in the base plate for connecting said frame to the hood, an electricity conducting thrust arm depending from and insulated from the hood, and an electricity conducting thrust lock mounted on and insulated from the base plate; contact between said arm and block limiting travel of the head into the hood and controlling an electric circuit.

In testimony whereof I affix my signature.

GEORGE KAUPERT.